United States Patent
Bönsel et al.

(12)

(10) Patent No.: US 6,391,818 B1
(45) Date of Patent: May 21, 2002

(54) POLYBETAINE STABILIZED PLATINUM NANOPARTICLES, METHOD FOR THE PRODUCTION THEREOF AND UTILIZATION FOR FUEL-CELL CATALYSTS

(75) Inventors: Harald Bönsel, Whitehouse Station, NJ (US); Gregor Deckers, Frankfurt (DE); Georg Frank, Tübingen (DE); Hans Millauer, München (DE); Thomas Soczka-Guth, Hofheim (DE)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 09/555,980
(22) PCT Filed: Dec. 3, 1998
(86) PCT No.: PCT/EP98/07863
§ 371 Date: Aug. 31, 2000
§ 102(e) Date: Aug. 31, 2000
(87) PCT Pub. No.: WO99/29423
PCT Pub. Date: Jun. 17, 1999

(30) Foreign Application Priority Data

Dec. 8, 1997 (DE) .......................................... 197 54 304

(51) Int. Cl.$^7$ ................................................ B01J 31/06
(52) U.S. Cl. ...................................................... 502/159
(58) Field of Search .......................................... 502/159

(56) References Cited

FOREIGN PATENT DOCUMENTS

| DE | 44 43 705 | 6/1996 |
|---|---|---|
| EP | 0 879 642 | 11/1998 |

OTHER PUBLICATIONS

Toshima et al., Polymer–protected Palladium–Platinum Bimetallic Clusters: Preparation, Catalytic Properties and Structural Considerations, *J. Chem. Soc.*, 89(14), pp. 2537–2543 (1993). No month.

*Primary Examiner*—Elizabeth D. Wood
(74) *Attorney, Agent, or Firm*—Connolly Bove Lodge & Hutz LLP

(57) ABSTRACT

Polybetaine-stabilized nanosize platinum particles, a process for preparing them and their use for electrocatalysts in fuel cells Soluble nanosize particles which have a diameter of from 0.5 to 3 nm, preferably from 1 to 2 nm, comprise platinum alone or platinum and other metals of the platinum group and are embedded in a protective colloid which comprises polymeric betaines and can be degraded by hydrolysis. The betaine is preferably a carbobetaine of the formula $-N^+R^1R^2-(-CH_2-)_n-CO_2^-$, a phosphobetaine of the formula $-N^+R_1R_2-(-CH_2-)_n-PO_3-$ or, preferably, a sulfobetaine of the formula $-N^+R_1R_2-(-CH_2-)_n-SO_3-$, where $R^1$ and $R^2$ may, independently of one another, be identical or different and are alkyl radicals having from 1 to 6 carbon atoms and n is 1, 2 or 3. Also described are a process for preparing the nanosize particles and catalysts produced therefrom and also their use for fuel cells.

23 Claims, No Drawings

POLYBETAINE STABILIZED PLATINUM NANOPARTICLES, METHOD FOR THE PRODUCTION THEREOF AND UTILIZATION FOR FUEL-CELL CATALYSTS

BACKGROUND OF THE INVENTION

1. Field of the Invention

The invention relates to soluble nanosize particles which comprise platinum alone or platinum together with other metals of the platinum group and are stabilized by protective colloids, and also to a process for preparing them by the sol process, wherein the protective colloids consist completely or partly of polymers which bear side chains containing a sulfobetaine group and can be degraded by hydrolysis. The invention further relates to catalysts produced from the abovementioned nanosize particles and to their use for electrodes of membrane fuel cells.

2. Description of the Prior Art

For reasons of declining energy reserves and of environmental protection, electric drives for the operation of motor vehicles are of great importance as a future-oriented alternative to conventional internal combustion engines. A considerable technical problem is still presented by the provision of electric energy onboard the vehicle. Vehicles powered by rechargeable batteries have only a small storage capacity and therefore allow only limited ranges. In contrast, fuel cells which generate the electric energy onboard the vehicle from a chemical fuel offer, due to the high storage density of the chemical energy carrier and because of their superior efficiency in energy conversion, comparable ranges to those of present-day internal combustion engines.

Fuel cells based on platinum catalysts and on polymeric solid electrolyte membranes have considerable advantages for powering vehicles. Due to their mode of construction, membrane fuel cells are referred to as "polymer electrode membrane fuel cells", PEMFC or PEFC.

Although a highly developed prior art for membrane fuel cells already exists, a further improvement in the performance together with a reduced usage of the expensive noble metal platinum is required for economic use of production-line electric drives in motor vehicles.

The key part of a PEMFC is a gastight but proton-permeable membrane of a cation-exchange polymer, i.e. a polymer to which negatively charged, acid groups are bound. Both sides of the membrane are covered with a thin layer of a mixture of nanosize platinum particles and fine particles of electrically conductive carbon. The platinum acts as catalyst for the two electrochemical substeps, namely oxidation of the fuel at the anode and reduction of oxygen at the cathode. The outer covering of the platinum/carbon layer in each case comprises the current collector, namely a gas-permeable nonwoven or paper made of electrically conductive carbon fibers. Together with the platinum/carbon layer, the current collector forms the anode or cathode, respectively, of the fuel cell. The complete assembly of all components, anode-membrane-cathode, is referred to as a "membrane electrode assembly" (MEA).

The transport of the gaseous reactants to the electrodes, i.e. of the fuel to the anode and of the atmospheric oxygen to the cathode, occurs backward through the gas-permeable current collector. The anode current collector serves to carry away the electrons which are liberated in the oxidation of the fuel. The cathode current collector serves to supply electrons which are required at the cathode for reduction of the oxygen. The external electronic charge flow from the anode to the cathode corresponds to the external electric circuit with the power consumer located in between. Internal, protic charge transport occurs by protons formed at the anode due to oxidation of the fuel being transported by means of the negatively charged solid-state ions through the cation-exchange membrane to the cathode and there combining with the reduction products of the oxygen to form water.

J. Electrochem. Soc. 143 (1996) L7 describes platinum colloids on a highly porous carbon support. The platinum particles are generated on the support by the impregnation method.

WO 91/19 566 discloses alloys of noble metals with cobalt, chromium and/or vanadium on carbon supports, which are produced by stepwise deposition of the metals on the support and subsequent calcination.

EP-A-0 106 197 discloses catalysts comprising, inter alia, thin, flat platinum crystallites on a graphite support and a process for preparing them in which they are deposited electrochemically on the support.

DE-A-27 19 006 claims catalysts in which the cations of the catalytically active metal are bound to the carbon support via acid groups and the catalyst is used without prior reduction in the process to be catalyzed.

It is also known that heterogeneous catalysts for chemical and electrochemical processes, whose active centers consist of a metal, in particular a noble metal, can be prepared on the basis of a sol process. Here, a sol of the appropriate catalytically active metal or, if desired, a plurality of metals is firstly produced in a separate process step and the dissolved or solubilized nanosize particles are subsequently immobilized on the support. The general advantage of the sol process is the high dispersion of the particles which can be achieved, with the lower limit at present extending, for example, to about 1 nanometer in the case of platinum.

General descriptions of these methods may be found, inter alia, in (a) B. C. Gates, L. Guczi, H. Knozinger, Metal Clusters in Catalysis, Elsevier, Amsterdam, 1986; (b) J. S. Bradley in Clusters and Colloids, VCH, Weinheim 1994, p. 459–544; (c) B. C. Gates, Chem. Rev. 1995, 95, 511–522.

The sols are generally produced using a stabilizer, in particular when further-processable sols having a metal concentration of 0.1% or more are required. The catalyst envelopes the metal particles and prevents agglomeration of the particles by means of electrostatic or steric repulsion. In addition, the stabilizer influences the solubility of the particles to some degree.

As stabilizers, it is possible to use both low molecular weight compounds and polymeric compounds.

Platinum sols comprising low molecular weight, mainly surface-active stabilizers and their use for producing catalysts for fuel cells have been described many times:

EP-A-0 672 765 discloses the electrochemical preparation of platinum hydrosols using cationic and betainic stabilizers and also catalysts produced therefrom which are said to be suitable, inter alia, for fuel cells.

DE-A-44 43 701 discloses platinum-containing coated catalysts which are said to be suitable for fuel cells. Here, the Pt particles form a shell which Th extends into the support particle to a depth of up to 200 nm. A process for producing them via a cationically stabilized hydrosol is also claimed.

DE-A44 43 705 claims the preparation of surfactant-stabilized metal colloids as precursors for heterogeneous catalysts.

Platinum sols comprising polymeric stabilizers and their use for producing catalysts, inter alia for fuel cells, have likewise been described. These involve the use of, for example, polyacrylic acid, polyvinyl alcohol or poly(N-vinylpyrrolidone). Apart from the purpose of stabilizing the sol concerned, the polymers mentioned have achieved no functional importance.

J. Am. Chem. Soc. 101 (1979) 7214 describes platinum colloids for the photolysis of water which have a hydrodynamic diameter of from 22 to 106 nm and are stabilized by means of polyvinyl alcohol.

Chemistry Letters 1981 793 describes polymer-supported platinum colloids which have a particle size of from about 1.5 to 3.5 nm and have been prepared using poly(N-vinylpyrrolidone) or polyvinyl alcohol.

Science 272 (1996) 1924 describes platinum particles stabilized with sodium polyacrylate. It has been found that the edge length and the crystal shape of the particles depends on the ratio of the amounts of stabilizer and platinum.

Furthermore, it has also been shown that the presence of a stabilizer can be unnecessary if the sol is produced in the presence of a support. DE-A-25 59 617 discloses the production of catalysts by converting a platinum salt into a metastable colloid in the presence of a support so that the colloid is deposited on the support.

U.S. Pat. No. 4,937,220 discloses a process for reducing recrystallization by applying a dispersion of different crystal sizes and shapes to the carbon support.

DE-A-2848138 teaches a process for reducing recrystallization by depositing porous carbon on and around the platinum crystallites located on the carbon particles.

U.S. Pat. No. 4,610,938 discloses electrodes for fuel cells whose catalytically active surface is adjoined by a layer of a fluorinated polymer bearing acid groups.

U.S. Pat. No. 4,876,115 describes the coating of carbon supports which are laden with platinum particles of 2–5 nanometers in diameter in an amount of about 0.35 mg/cm$^2$ of Pt with a perfluorinated cation-exchange resin for increasing the proton conductivity.

In practice, it has not been fully possible to achieve electrochemical processes and mass transfer processes, which occur in both electrode layers of a membrane fuel cell, such that low losses occur. As a result of insufficient contact with the electron- and/or proton-conducting phase, a considerable part of the platinum used is not able to function or able to function only to a restricted extent, which finally leads to reduced performance of the cell and in conventional systems is compensated for by very high platinum loadings. In particular, it has been found that more platinum is required than would be necessary per se to achieve a particular electric output. In practice, the platinum usage is from about 0.5 to 4 mg/cm$^2$ of membrane area. This has hitherto corresponded to several 100 g of platinum for a practical vehicle having a motor power of 40–50 kW. Some scientific publications and patents have already disclosed considerably lower platinum usages in the order of from 0.1 to 0.2 mg/cm$^2$. However, fuel cells used under realistic conditions of road traffic still require a significantly higher platinum usage.

One critical reason for the increased platinum requirement is the process hitherto predominantly employed for preparing the platinum/carbon mixture. In this process, the solution of a reducible or precipitable platinum compound is applied to the carbon support by impregnation or spraying. The platinum compound is subsequently converted into finely divided platinum or platinum oxide particles by precipitation and/or chemical reduction, frequently resulting in formation of relatively large particles having sizes up to some 10 to 100 nm. This results in a reduction in the catalytic activity due to the reduction in the specific platinum surface area.

It is also known that a platinum catalyst on a carbon support loses surface area under the customary operating conditions, i.e. at an elevated temperature.

The above-described relationships between, firstly, the particle size of the metal centers and their catalytic activity and, secondly, the established tendency for the particle size to increase by agglomeration require precise control of the size of the particles and of the microstructure of the matrix surrounding them. The necessary degree of these properties has hitherto not been able to be achieved by conventional preparation techniques.

SUMMARY OF THE INVENTION

In view of the prior art, it is an object of the invention firstly to achieve high dispersion of the catalytically active platinum centers, secondly to ensure unhindered transport of starting materials, products and also protons and electrons and thirdly to reduce the recrystallization of the platinum particles to form larger particles on the carbon support.

It has surprisingly been found that the use of polymeric betaines gives sols having particularly small particles with a diameter of typically 1 nanometer. This achieves a very high dispersity and thus sparing use of the expensive noble metals.

The invention provides nanosize particles which comprise platinum alone or platinum and other metals of the platinum group and are embedded in a protective colloid which comprises polymeric betaines and can be degraded by hydrolysis.

The invention also provides a process for immobilizing the abovementioned nanosize particles in a fine, uniform distribution on the surface or in surface regions of a carbon support and, if desired, subsequently to remove the protective colloid completely or partially by hydrolytic degradation.

Furthermore, the invention provides a process for preparing nanosize particles which comprise platinum alone or platinum and other metals of the platinum group and are embedded in a protective colloid which comprises polymeric betaines and can be degraded by hydrolysis, by reacting a platinum compound alone or a platinum compound together with one or more compounds of metals selected from the group consisting of rhodium, ruthenium, iridium and palladium with a reducing agent in water or a solvent, wherein the reduction is carried out in the presence of a polymeric betaine or the polymeric betaine is added to the sol after the reduction step, and, if desired, the stabilized sol is subsequently purified by reprecipitation and/or concentrated by evaporation.

The invention further provides a process for producing catalysts for fuel cells, which comprises bringing a finely divided support, for example of carbon, carbon black or graphite, into contact with a sol of the abovementioned nanosize particles, separating the catalyst formed from the liquid phase by filtration or centrifugation and, if desired, subsequently removing the protective colloid completely or partially from the catalyst by treatment with a base.

The nanosize particles provided by the invention or the catalysts obtained therefrom are suitable in principle for the anode and the cathode of a membrane fuel cell. However, a different structuring of nanosize particles or catalysts for the anode and the cathode for the purposes of the invention is not ruled out, but may be advantageous in individual cases.

The sols of the nanosize particles are, preferably after prior purification and concentration, applied to the support, with the stabilizer envelope being essentially retained.

DESCRIPTION OF THE PREFERRED EMBODIMENTS

In a preferred embodiment of the invention, the polymeric betaine envelope is completely or partially removed from the catalytically active centers after immobilization. This measure aids the transport of electrons and/or protons from or to the centers. The polymeric betaines used for this purpose according to the invention are, for example, derivatives of polyacrylic acid in which the side chains bearing betaine groups are linked to the main polymer chain via carboxylic ester groups and/or carboxamide groups. Degradation is achieved by hydrolysis of the carboxylic ester group or carboxamide group. The dissociation can be carried out by treating the catalyst with a base, for example an alkali metal hydroxide or ammonia.

The soluble nanosize particles obtainable according to the invention are particles having a diameter of from about 0.5 to 3 nanometers, preferably from about 1 to 2 nanometers, based on the metal core. The particles are soluble in water or an organic solvent, with "soluble" also meaning "solubilizable", i.e. sol-forming.

In the preparation according to the invention of nanosize particles, the starting materials used are the intended metals in the form of soluble compounds, in particular water-soluble compounds, for example hexachloroplatinic(IV) acid hydrate, hexachloroiridic(IV) acid hydrate, palladium (II) acetate, iridium(III) acetylacetonate, ruthenium(III) acetylacetonate, ruthenium(III) nitrate or rhodium(III) chloride hydrate. The metal compounds are used in a concentration of from about 0.1 to 100 g per liter, preferably from 1 to 50 g per liter, based on the solvent.

The polymeric betaines used according to the invention are made up of an essentially unbranched polymethylene main chain and various side chains bearing betaine groups.

For example, the side chains comprise an alkylene radical having from about 2 to 12 carbon atoms, preferably from 2 to 4 carbon atoms, and bear a betaine group at the end. The side chain is linked to the main chain via a carboxylic ester group or via a carboxamide group. In polymers of the abovedescribed type, the side chain can be split off by simple means, for example by reaction with a base.

The side chain can also be formed by an N-containing, heterocyclic ring system, for example a pyridine ring, where the nitrogen atom of the betaine group belongs to the ring system and the linkage to the main chain is via carbon or possibly further nitrogen atoms of the ring system.

The betaine group may consist of a carbobetaine, $-N^+R^1R^2-(-CH_2-)_n-CO_2^-$, a phosphobetaine, $-N^+R_1R_2-(-CH_2-)_n-PO_3^-$ or preferably a sulfobetaine, $-N^+R_1R_2-(-CH_2-)_n-SO_3^-$, where $R^1$ and $R^2$ are identical or different alkyl radicals having from 1 to 6 carbon atoms and n is 1, 2 or 3.

Examples of suitable polymers are poly[N,N-dimethyl-N-methacryloxyethyl-N-(3-sulfopropyl)ammonium betaine] of formula 1:

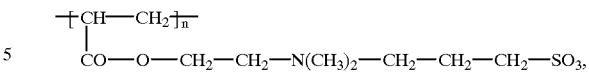

poly[N,N-dimethyl-N-methacrylamidopropyl-N-(3-sulfopropyl)ammonium betaine] of formula 2:

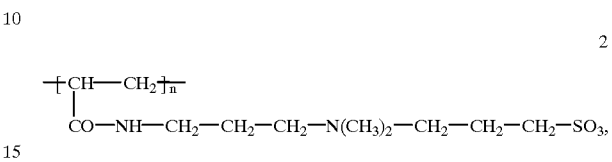

poly[1-(3'-sulfopropyl)-2-vinylpyridinium betaine] of formula 3:

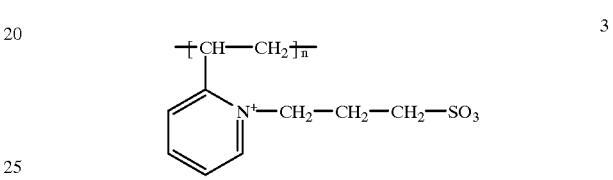

The above-described polymers are prepared by free-radical polymerization from the corresponding monomers which are commercially available. The polybetaines have degrees of polymerization of from about 50 to 10,000, preferably from 100 to 1000.

It is also possible to use copolymers made up of various monomers from the above-described categories.

Furthermore, it is possible to use copolymers made up of the above-described monomers containing betaine groups together with further monomers such as acrylic acid, acrylic esters, acrylamides, vinyl carboxylates, vinyl alkyl ethers, N-vinylpyridine, N-vinyl pyrrolidone or N-vinylcarboxamides.

In the process of the invention, the polybetaines are used in amounts of from 5 to 2000% by weight, preferably from 20 to 400% by weight, based on the metal or metals.

The process of the invention is carried out in water or in a mixture of water and a (or a plurality of) water-miscible organic solvent(s) or in the absence of water in an organic-solvent.

Examples of suitable solvents are methanol, ethanol, ethylene glycol, tetrahydrofuran, dimethoxyethane, acetone, N-methylpyrrolidone, dimethyl-formamide and dimethylacetamide. The sols are preferably prepared in water (hydrosols) or in water with addition of from 1 to 50% by weight, preferably from 5 to 25% by weight, of an organic solvent.

Suitable reducing agents are all customary reducing agents which have a sufficiently negative reduction potential, for example hydrogen, sodium borohydride, ethanol, ethylene glycol and hydroxymethanesulfinic acid sodium salt. The preferred reducing agent is hydroxymethanesulfinic acid sodium salt (Rongalit®). The reducing agent is generally used in a stoichiometric amount based on the metal compound(s), but preferably in a certain excess. The excess can be, for example, from 10 to 100%.

The preparation of the sols is carried out at temperatures of from 0 to 200° C., preferably from 20 to 100° C. The components can generally be added in any order. It is advantageous to aid mixing by means of stirring. In the preferred procedure, the reducing agent is added last. If the polymeric betaine is added only after the reduction, the addition has to be carried out before agglomeration commences.

The platinum-polybetaine complexes present in the sols of the invention are novel compounds of relatively uniform composition. Examination of the particles by transmission electron microscopy (TEM) indicated a very narrow size distribution. Typically 90% of the particles deviate by less than 20% from the mean diameter. The diameter of the metal core depends to some degree on the type and amount of stabilizer used. It is generally less than 3 nanometers, usually less than 2 nanometers. In most cases, the diameter of the metal core is about 1 nanometer.

For further processing of the sols to give catalysts, i.e. for producing the platinum/carbon black mixture, metal concentrations of at least 10 g/liter are generally desired. The sols obtained according to the invention can, if desired, be evaporated by gently distilling off water and/or the solvent. If required, the sols obtained according to the invention can be purified by reprecipitation in a manner known per se and, if desired, concentrated at the same time. The precipitation of a colloidally dissolved platinum-cation-exchange polymer complex can be carried out by addition of acetone or isopropanol. The platinum-cation-exchange polymer gels obtained can be redissolved in water. The metal concentrations which can be achieved in this way are from 50 to 100 g/liter.

To produce catalysts, the aqueous sols prepared as described above are brought into contact with a finely pulverulent, conductive carbon support and the liquid phase is subsequently separated off. In this procedure, the platinum-cation-exchange polymer complex is immobilized on the support particles. It has been found that the platinum-cation-exchange polymer complexes of the invention are preferentially deposited on the surface or in surface regions of the support and have good adhesion to the support.

The support comprises finely divided carbon, carbon black or graphite. Preference is given to using specific, electrically conductive carbons (carbon black) which are commercially available, for example ®Vulcan XC 72R.

The carbon supports to be used can be additionally treated with materials, for example with proton-conducting polymers, before or after loading with the nanosize Pt particles of the invention. This procedure is described in principle in U.S. Pat. No. 4,876,115.

One way of carrying out the loading of the carbon support is to introduce the sol with mixing into a suspension of the support in water or a water/alcohol mixture, to stir the suspension further and to isolate the platinum/carbon mixture by filtration or centrifugation.

EXAMPLE 1

1000 ml of deionized water were placed in a 2 l conical flask. 2.50 g (about 5 mmol) of hexachloroplatinic acid hydrate (platinum content about 40%) were added thereto and 5% strength ammonia solution was added dropwise until a pH of 7 had been reached. At 95° C. while stirring, 1.00 g of poly[N,N-di-methyl-N-methacryloxyethyl-N-(3-sulfopropyl)ammonium betaine] of formula 1 and subsequently a solution of 2.50 g (21 mmol) of hydroxymethane-sulfinic acid sodium salt dihydrate (Rongalit®) in 20 ml of deionized water were added thereto. The mixture was allowed to cool to room temperature and allowed to stand for 8 hours, the hydrosol was admixed with 1000 ml of acetone, stirred for 5 minutes and the precipitate formed was allowed to settle for 15 hours. After decanting off most of the supernatant liquid, the remainder was centrifuged at 7000 rpm for 15 minutes. The centrifuge residue was dissolved completely in water to 20.0 g, forming a dark reddish brown sol.

EXAMPLE 2

1000 ml of deionized water were placed in a 2 l conical flask. 2.50 g (about 5 mmol) of hexachloroplatinic acid hydrate (platinum content about 40%) were added thereto and 5% strength ammonia solution was added dropwise until a pH of 7 had been reached. At 95° C. while stirring, 1.00 g of poly[N,N-di-methyl-N-methacrylamidopropyl-N-(3-sulfopropyl)ammonium betaine] of formula 2 was added thereto and the mixture was subsequently processed further as described in Example 1. Work-up gave 20.0 g of a dark reddish brown sol.

EXAMPLE 3

1000 ml of deionized water were placed in a 2 l conical flask. 2.50 g (about 5 mmol) of hexachloroplatinicacid hydrate (platinum content about40%)were added thereto and 5% strength ammonia solution was added dropwise until a pH of 7 had been reached. At 95° C. while stirring, 1.00 g of poly[1-(3'-sulfopropyl)-2-vinylpyridinium betaine of formula 3 was then added thereto and the mixture was subsequently processed further as described in Example 1.

EXAMPLE 4

2.00 g of ®Vulcan XC 72R (manufacturer: Cabot B. V., Rozenburg, The Netherlands), 20 ml of water and 5 ml of methanol were placed in a 100 ml round-bottomed flask containing 5 porcelain spheres (diameter: 10 mm) and were mixed for 4 hours by rotation at 100 rpm on a rotary evaporator. While continuing the rotation, 8.0 g (about 0.4 g of platinum; stabilizer: poly[N,N-di-methyl-N-methacryloxyethyl-N-(3-sulfopropyl)ammonium betaine) sol concentrate which had been prepared as described in Example 1 and had been diluted with 5 ml of water was pumped into the resulting uniform suspension at 20–25° C. over the course of 0.5 hours. The suspension was subsequently rotated for another 3 hours. The coated carbon was centrifuged and dried over concentrated sulfuric acid in a vacuum desiccator. The yield was 2.47 g. Analysis of the catalyst obtained indicated 11% of platinum (ICP-OES). TEM analysis of the catalyst (transmission electron microscope: Philips CM 30; the particles were applied to a carbon-coated copper grid) indicated a fine coating of platinum particles whose diameter was not more than about 1 nanometer.

EXAMPLE 5

An immobilization was carried out by a method analogous to Example 4. The support material used was 2.00 g of ®Vulcan XC 72R (manufacturer: Cabot B. V. Rozenburg, The Netherlands) which had previously been treated with a solution of sulfonated polyether ether ketone (PEEK), molecular weight $M_n$ about 80,000, degree of sulfonation 50.7%). 6.6 g (about 0.3 g of platinum, stabilizer: poly[N,N-dimethyl-N-methacryloxyethyl-N-(3-sulfopropyl) ammonium betaine]) sol concentrate which had been prepared as described in Example 1 were used.

The yield was 1.9 g.

What is claimed is:

1. Nanosize particles which comprise platinum alone or platinum and other metals of the platinum group and are embedded in a protective colloid which comprises a polymer which bears side chains containing a sulfobetaine group and can be degraded by hydrolysis.

2. The nanosize particles as claimed in claim 1, wherein the particles have diameters of from 0.5 to 3 nm.

3. The nanosize particles as claimed in claim 1, which comprise at least one polymer which contains sulfobetaine groups and bears a side chain comprising an alkylene radical having from about 2 to 12 carbon atoms.

4. The nanosize particles as claimed in claim 1, wherein the betaine is a carbobetaine of the formula —$N^+R^1R^2$—(—$CH_2$—)$_n$—$CO_2$—, a phosphobetaine of the formula —$N^+R_1R_2$—(—$CH_2$—)$_n$—$PO_3$— or a sulfobetaine of the formula —$N^+R_1R_2$—(—$CH_2$—)$_n$—$SO_3$—, where $R_1$ and $R_2$ independently of one another, are identical or different and are alkyl radicals having from 1 to 6 carbon atoms and n is 1, 2 or 3.

5. The nanosize particles as claimed in claim 1, wherein the protective colloids are compounds of the formulas 1, 2 or 3:

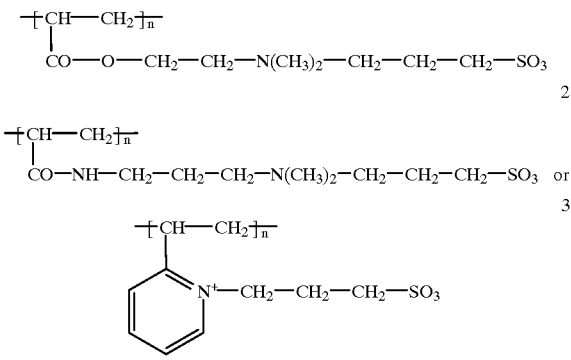

where n is 1, 2 or 3.

6. The nanosize particles as claimed in claim 1, wherein said polymer has a degree of polymerization of from 50 to 10,000.

7. The nanosize particles as claimed in claim 1, wherein said polymer comprises a polymer comprising both monomers containing sulfobetaine groups and monomers selected from the group consisting of acrylic acid, acrylic esters, acrylamides, vinyl carboxylates, vinyl alkyl ethers, N-vinylpyridine, N-vinylpyrrolidone and N-vinylcarboxamides.

8. A process for preparing the nanosize particles as claimed in claim 1, which comprises reacting a platinum compound alone or a platinum compound together with one or more compounds of metals selected from the group consisting of rhodium, ruthenium, iridium and palladium with a reducing agent in water or a solvent, wherein the reduction is carried out in the presence of a polymer which bears side chains containing a sulfobetaine group or said polymer is added to a sol after the reduction step.

9. The process as claimed in claim 8, wherein the starting materials for preparing the nanosize particles are compounds compounds which are soluble in water or solvents.

10. The process as claimed in claim 8, wherein the starting materials for preparing the nanosize particles are used in concentrations of from about 0.1 to 100 g per liter based on the solvent.

11. The process as claimed in claim 8, wherein the reducing agent is hydrogen, sodium borohydride, ethanol, ethylene glycol or hydroxymethanesulfinic acid sodium salt.

12. The process as claimed in claim 8, wherein the reducing agent is used in a stoichiometric amount based on the metal compound(s).

13. The process as claimed in claim 8, wherein the solvent is methanol, ethanol, ethylene glycol, N-methylpyrrolidone, dimethylformamide, dimethylacetamide or tetrahydrofuran, or a mixture of these substances with water.

14. The process as claimed in claim 8, carried out at temperatures of from 0 to 200° C.

15. A catalyst prepared by bringing a carbon support into contact with a sol containing the nanosize particles as claimed in claim 1.

16. A catalyst as claimed in claim 15, wherein the catalyst has been treated with proton-conducting polymers.

17. The nanosize particles as claimed in claim 1, wherein the particles have diameters from 1 to 2 nm and which comprise at least one polymer which contains sulfobetaine groups and bears a side chain comprising alkylenie radicals having from about 2 to 4 carbon atoms.

18. The nanosize particles as claimed in claim 17, wherein the betaine is a sulfobetaine of the formula —$N^+R_1R_2$—(—$CH_2$—)$_n$—$SO_3$—.

19. The nanosize particles as claimed in claim 18, wherein said polymer has a degree of polymerization of from 100 to 1000.

20. The process as claimed in claim 11, wherein the starting materials for preparing the nanosize particles are water-soluble salts and the starting materials for preparing the soluble nanosize particles are used in concentrations of from 1 to 50 g per liter based on the solvent and the reducing agent is hydroxymethanesulfinic acid sodium salt which is used in an excess of from 10 to 100% based on the metal of compound(s) and the process is carried out at temperatures of from 20 to 100° C.

21. The process as claimed in claim 20, wherein said water-soluble salts are hexachloroplatinic(IV) acid hydrate, hexachloroiridic(IV) acid hydrate, palladium(II) acetate, iridium(III) acetylacetonate, ruthenium(III) acetylacetonate, ruthenium(III) a nitrate, or rhodium(III) chloride hydrate.

22. A process for producing catalysts useful in the production of fuel cells which comprises bringing a finely divided support into contact with a sol and said sol comprises nanosize particles which comprise platinum alone or platinum and other metals of the platinum group and are embedded in a protective colloid which comprises a polymer which bears side chains containing a sulfobetaine group and can be degraded by hydrolysis.

23. The process as claimed in claim 8, wherein the sol is purified by reprecipitation and/or concentrated by evaporation.

* * * * *

UNITED STATES PATENT AND TRADEMARK OFFICE
CERTIFICATE OF CORRECTION

PATENT NO.    : 6,391,818 B1
DATED         : May 21, 2002
INVENTOR(S)   : Bönsel et al.

It is certified that error appears in the above-identified patent and that said Letters Patent is hereby corrected as shown below:

Column 9,
Line 56, delete the word "compounds".

Column 10,
Line 23, delete the word "alkylenie" and insert the word -- alkylene --.

Signed and Sealed this

Twentieth Day of August, 2002

Attest:

Attesting Officer

JAMES E. ROGAN
Director of the United States Patent and Trademark Office